United States Patent
Lu et al.

(10) Patent No.: US 10,819,631 B2
(45) Date of Patent: Oct. 27, 2020

(54) NETWORK DEVICE SUPPORTING TRILL PROTOCOL AND COMMUNICATION METHOD THEREOF

(71) Applicant: ACCTON TECHNOLOGY CORPORATION, Hsinchu (TW)

(72) Inventors: Tan-Chun Lu, New Taipei (TW); Yu-Cheng Tsao, Changhua County (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/274,255

(22) Filed: Feb. 13, 2019

(65) Prior Publication Data
US 2019/0253348 A1    Aug. 15, 2019

(30) Foreign Application Priority Data
Feb. 14, 2018 (TW) .............................. 107105658 A

(51) Int. Cl.
| | | |
|---|---|---|
| H04L 12/721 | (2013.01) | |
| H04L 12/46  | (2006.01) | |
| H04L 12/823 | (2013.01) | |
| H04L 12/709 | (2013.01) | |

(52) U.S. Cl.
CPC ............ *H04L 45/66* (2013.01); *H04L 12/467* (2013.01); *H04L 12/4645* (2013.01); *H04L 12/4695* (2013.01); *H04L 45/245* (2013.01); *H04L 47/32* (2013.01)

(58) Field of Classification Search
CPC ..... H04L 45/66; H04L 12/4695; H04L 47/32; H04L 45/245; H04L 12/4625; H04L 12/467; H04L 12/721; H04L 12/46; H04L 45/02; H04L 12/4633; H04L 12/4641
See application file for complete search history.

(56) References Cited

U.S. PATENT DOCUMENTS

| | | | |
|---|---|---|---|
| 8,125,928 B2* | 2/2012 | Mehta ................. | H04L 12/4625 370/254 |
| 8,995,444 B2* | 3/2015 | Jha .......................... | H04L 45/66 370/392 |
| 9,054,999 B2* | 6/2015 | Radhakrishnan ....... | H04L 45/66 |
| 9,288,288 B2* | 3/2016 | Melman .................. | H04L 69/18 |
| 9,479,420 B2* | 10/2016 | Gao ....................... | H04L 12/413 |
| 2013/0100858 A1* | 4/2013 | Kamath .................. | H04L 49/25 370/255 |
| 2014/0146710 A1* | 5/2014 | Yang ....................... | H04L 41/12 370/255 |

* cited by examiner

Primary Examiner — Hanh N Nguyen
(74) Attorney, Agent, or Firm — CKC & Partners Co., LLC

(57) ABSTRACT

A network device supporting TRILL protocol includes a memory, a processor, and a communication interface. The memory includes a lookup table stored therein. The processor is coupled to the memory. The communication interface is coupled to the processor. The communication interface includes a trunk port and an access port and is configured to receive a first packet. When the processor determines that an output port corresponding to a destination address of the first packet is the trunk port, and determines that there is a lack of nickname information corresponding to the destination address according to the look up table, a second packet is transmitted through the trunk port of the communication interface. The second packet includes an enable local bit. The second packet and the first packet include the same payload information.

14 Claims, 3 Drawing Sheets

NETWORK DEVICE SUPPORTING TRILL PROTOCOL AND COMMUNICATION METHOD THEREOF

CROSS-REFERENCE TO RELATED APPLICATION

This application claims priority to Taiwan Application Serial Number 107105658, filed Feb. 14, 2018, which is herein incorporated by reference in its entirety.

BACKGROUND

Technical Field

The present disclosure relates to a network device supporting TRILL protocol and a communication method thereof. More particularly, the present disclosure relates to a network device supporting TRILL protocol and a communication method thereof for communication between TRILL devices and non-TRILL devices.

Description of Related Art

TRILL (Transparent Interconnection of Lots of Links, TRILL) technology is a standard for the Internet Engineering Task Force (IETF) protocol. TRILL technology uses layer 3 routing technologies to construct a fairly large cloud for the network layer 2, so when the host moves in the cloud of the layer 2 network, it can smoothly transfer to another node (for example, a router) to continue to operate and provide services without changing the IP address setting.

TRILL protocol defines the behavior of the access link to handle the incoming and outgoing of the Ethernet frames from or to the non-TRILL devices (means devices that is not compatible with TRILL protocol.). TRILL protocol further defines the behavior of the trunk link, so as to handle incoming/outgoing frames that contain TRILL headers. However, TRILL protocol does not define the behavior of links that connect between TRILL devices and non-TRILL devices.

That is, if a non-TRILL device is set between TRILL devices, under the TRILL protocol, a packet containing a TRILL header can be transmitted by a non-TRILL device but cannot be accessed by a non-TRILL device. That is, non-TRILL devices connected between TRILL devices cannot be accessed and/or managed under the TRILL protocol.

Therefore, how to transmit data to a non-TRILL device to effectively access and/or manage the non-TRILL device when non-TRILL devices and TRILL devices are simultaneously provided is a problem to be improved in the field.

SUMMARY

An aspect of the present disclosure is to provide a network device supporting TRILL protocol. The network device includes a memory, a processor, and a communication interface. The memory includes a lookup table stored therein. The processor is coupled to the memory. The communication interface is coupled to the processor. The communication interface includes a trunk port and an access port and is configured to receive a first packet. When the processor determines that an output port corresponding to a destination address of the first packet is the trunk port, and determines that there is a lack of nickname information corresponding to the destination address according to the look up table, a second packet is transmitted through the trunk port of the communication interface. The second packet includes an enabled local bit. The second packet and the first packet include the same payload information.

Another aspect of the present disclosure is to provide a communication method suitable for a network device supporting TRILL protocol. The communication method includes the following operations: receiving a first packet by a communication interface; transmitting a second packet by the trunk port of the communication interface after setting an enabled local bit in a second packet when a processor determines that an output port corresponding to a destination address of the first packet is a trunk port and there is a lack of nickname information corresponding to an output port. The second packet and the first packet include the same payload information.

In sum, the embodiments of the present disclosure provide a network device supporting the TRILL protocol and the communication method thereof, so as to effectively access and/or manage the non-TRILL devices and reduce the probability of packets being cyclically forwarding when non-TRILL devices and TRILL devices are set at the same time.

BRIEF DESCRIPTION OF THE DRAWINGS

The present disclosure can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In this document, the term "coupled" may also be termed as "electrically coupled," and the term "connected" may be termed as "electrically connected." "Coupled" and "connected" may also be used to indicate that two or more elements cooperate or interact with each other.

Figure 1:
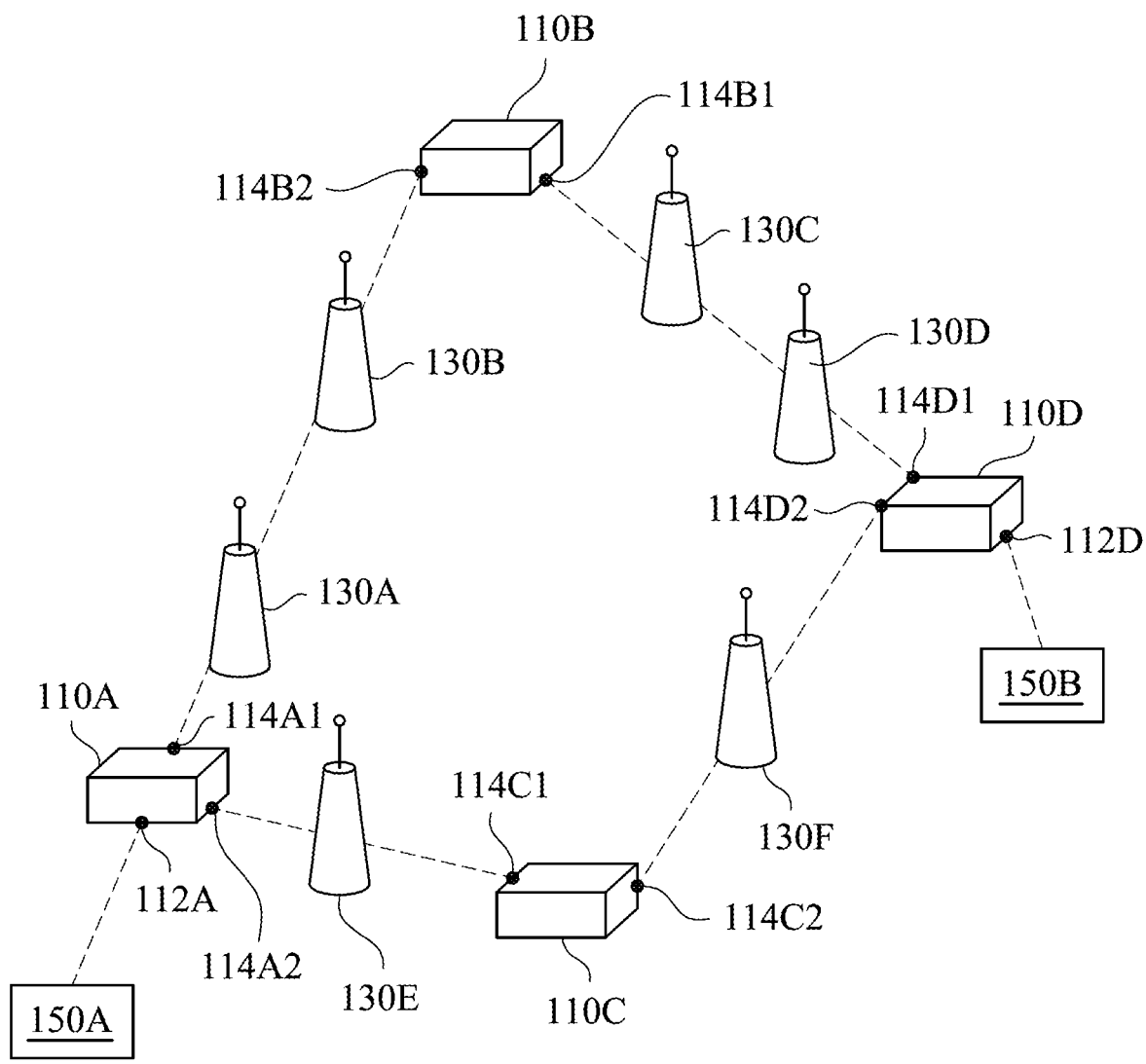
FIG. 1 is a schematic diagram of a communication system according to some embodiments of the present disclosure.

Reference is made to FIG. 1. FIG. 1 is a schematic diagram of a communication system 100 according to some embodiments of the present disclosure. The communication system 100 includes several non-TRILL devices 130A to 130F, several TRILL devices 110A to 110D, and servers 150A, 150B. TRILL devices 110A to 110D communicate with each other through part of the several non-TRILL devices 130A to 130F respectively. Servers 150A, 150B communicate to one of the several TRILL devices 110A to 110D respectively.

TRILL devices are devices that are compatible with TRILL protocol, and the devices may be, for example, switches, routers, wireless access points or other devices which are suitable to provide equivalent function. Non-TRILL devices are devices that are not compatible with TRILL protocol, and the devices may be, for example, switches, routers, wireless access points or other devices which are suitable to provide equivalent function.

In some embodiments, each of the non-TRILL devices 130A to 130F, TRILL devices 110A to 110D, and servers 150A, 150B has owned MAC address (Media Access Control Address).

In some embodiments, each of the TRILL devices 110A to 110D includes an access port and/or a trunk port. The access port is a port that is defined to transmit packets which is without TRILL header, and the trunk port is a port that is defined to transmit packets which is with TRILL header.

Take FIG. 1 as reference, TRILL devices 110A to 110D include trunk port 114A1, 114A2, 114B1, 114B2, 114C1, 114C2 114D1, and 114D2 respectively. TRILL devices 110A and 110D include access port 112A and 112D respectively, and receive packets transmitted from servers 150A, 150B respectively. Each of the TRILL devices 110A to 110D includes a lookup table. The lookup table may include forwarding table and nickname table. In an embodiment, the lookup table may further be a lookup table which integrates forwarding table and nickname table information therein.

The forwarding table includes port information corresponding to MAC address, and is configured to look up an output port corresponding to a destination address included in a packet. The nickname table includes MAC addresses corresponding to each of the TRILL devices 110A to 110D and nickname information corresponding thereto. For example, the nickname information in the nickname table of the TRILL device 110A includes nickname B corresponding to the MAC address of the TRILL device 110B, nickname C corresponding to the MAC address of TRILL device 110C, and nickname D corresponding to the MAC address of TRILL device 110D.

Through the lookup table, TRILL devices 110A to 110D may acquire which port is used to forward the packet, and therefrom determine the nickname corresponding to the destination address included in the packet, or may determine that there is a lack of nickname information corresponding to the destination address when the port used to forward the packet belongs to the trunk port. It is noted that, the above mentioned a lack of nickname information corresponding to the destination address may include situation that there is no nickname corresponding to the destination address in the lookup table. In the embodiments of the present disclosure, a lack of the nickname information corresponding to the destination address in the lookup table means that the destination address corresponds to a non-TRILL device.

Figure 2:
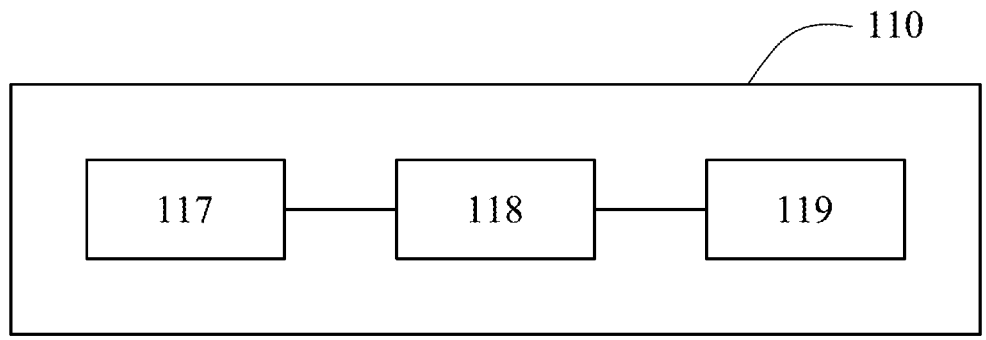
FIG. 2 is a schematic diagram of a TRILL device according to some embodiments of the present disclosure.

Reference is made to FIG. 2. FIG. 2 is a schematic diagram of a TRILL device 110 according to some embodiments of the present disclosure. TRILL device 110 may correspond to one of TRILL devices 110A to 110D as illustrated in FIG. 1. The TRILL device 110 includes a memory 117, a processor 118, and a communication interface 119. The memory 117 is coupled to the processor 118, and the processor 118 is further coupled to the communication interface 119. The memory 117 includes a lookup table. The communication interface 119 includes an access port and a trunk port as illustrated in FIG. 1.

Reference is made to FIG. 1 and FIG. 2. The following takes the case when the server 150A needs to transmit data to the non-TRILL devices 130E to explain how to receive data transmitted from the server by non-TRILL devices which are connected to the trunk port of TRILL devices. It is assumed that the TRILL devices 110A to 110D have obtained several path information according to several known methods in advance, and a lookup table is maintained accordingly. When the server 150A transmits the native frame or the native packet including the payload information to the TRILL device 110A, the TRILL device 110A receives the native frame or native packet through the communication interface 119. The processor 118 of TRILL device 110A may subsequently determine the native frame or native packet is received by an access port when the native frame or native packet is received by the access port 112. Subsequently, the processor 118 of the TRILL device 110A looks up the lookup table according to the destination address of the native frame or the native packet, and then determines whether the native frame or the native packet will be forwarded by a trunk port. When the processor 118 of the TRILL device 110A determines that the output port designated to forward the native frame or the native packet is a trunk port (as the trunk port 114A2 in the embodiment), the processor 118 of the TRILL device 110A further determines whether any nickname information corresponding to the destination address of the native frame or native packet exist in the lookup table.

In this case, since the output port designated to output the native packet or native frame belong to a trunk port, and the destination address corresponds to the address of the non-TRILL device 130E, there is a lack of nickname information corresponding to the destination address in the lookup table. Hence, the result will be a lack of the nickname information corresponding to the destination address in the lookup table after the processor 118 of the TRILL device 110A looks up in the lookup table according to the destination address of the native packet or native frame. In this situation, the packet encapsulated with the enabled local bit will be sent through the communication interface 119 of the TRILL device 110A. Since the packet with the enabled local bit does not have a TRILL header, the non-TRILL devices 130E will receive the packet including the enabled local bit and be able to access the payload of the packet. In addition, in an embodiment, in comply with the TRILL protocol, when the result is a lack of corresponding nickname information after looking up in the lookup table, a TRILL header may be embedded to the native frame, and its field of Egress Rbridge Nickname will be filled with a nick name corresponding to a nick name of the root router, and a packet embedded with above said TRILL header may be sent from the trunk port. Therefore, in embodiment of present invention, the trunk port will output both the packet with the enabled local bit and the packet with the TRILL header. Since the non-TRILL device is not compatible with TRILL protocol, the non-TRILL device 130E will directly forward the packet embedded TRILL header not access the packet embedded TRILL header. However, non-TRILL device 130E can access the data sent by server 150A through the packet included enabled local bit. Through the above-mentioned method, the server 150A is thus able to access or manage the non-TRILL devices 130E.

In the following, take the case when the server 150A transmits data to the non-TRILL devices 130F as an example, and assume that the TRILL devices 110A to 110D have established lookup table. The part of description herein, which is the same as the previous description, will be omitted for the sake of brevity. In the embodiment, since the output port is a trunk port, and the destination address is the address of the TRILL device 130F, there is nickname information corresponding to the destination address in the lookup table. Hence, the processor 118 of the TRILL device 110A can look up in the lookup table to find the nickname information corresponding to the destination address in the lookup table, and the foregoing nickname information is the nickname C corresponding to the MAC address of TRILL device 110C. In addition, in the embodiment, according to the TRILL protocol, when there is nickname information corresponding to the destination address in the lookup table, a TRILL header may be embedded to the native frame, and its field of Egress Rbridge Nickname will be filled with a nick name corresponding to the nickname C of the TRILL device 110C, and the packet with the TRILL header may be sent out from the trunk port 114A2.

Subsequently, after the TRILL device 110C receives the packet with the TRILL header through the trunk port 114C1, the processor 118 of the TRILL device 110C determine that the output port corresponding to the destination address included in the packet is the trunk port 114C2 after looking up the lookup table of the TRILL device 110C. The situation herein is similar to the previous example; and therefore, there is a lack of nickname information corresponding to the destination address in the lookup table of the non-TRILL device 130F. Hence, the result will be a lack of the nickname information corresponding to the destination address in the lookup table of the non-TRILL device 130F after the processor 118 of the TRILL device 110C looks up in the lookup table of the TRILL device 110C according to the destination address included in the packet. The processor 118 of the TRILL device 110C further sends out the packet with the enabled local bit through the communication interface 119 of the TRILL device 110C. In addition, same as the previous example; the field of Egress RBridge Nickname of the TRILL header of the packet is filled with a nick name corresponding to a nick name of root router. Subsequently, the packet with the TRILL header will also be sent out through the communication interface 119 of the TRILL device 110C.

Through the above-mentioned implementation, if the packet is intended to be transmitted to non-TRILL devices connected to the trunk port, the packet with the enabled local bit will be generated and transmitted as well. The non-TRILL devices may access the packet with the enabled local bit, and obtain the data sent by the server 150A through the packet included enabled local bit. Through the above-mentioned method, the server 150A is thus able to access or manage the non-TRILL devices 130E or 130F which are connected to the trunk port.

Contents of native frame and the packet with the enabled local bit will be explained in detail together with the following FIG. 3 and FIG. 4.

Figure 3:
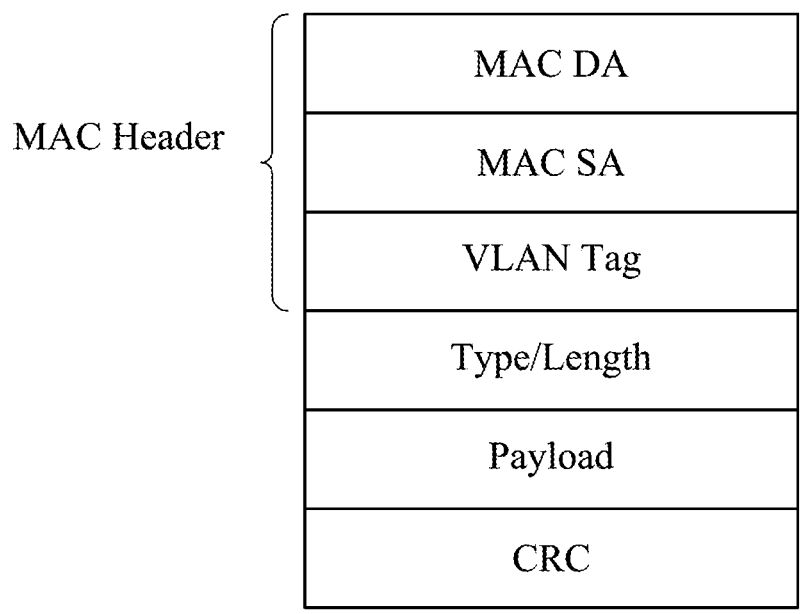
FIG. 3 is a schematic diagram of a native frame according to some embodiments of the present disclosure.

FIG. 3 is a schematic diagram of a native frame 300 according to some embodiments of the present disclosure. The native frame 300 does not include a TRILL header, and the native frame 300 does not include an enabled local bit.

Reference is made to FIG. 3, in some embodiments, the native frame 300 includes cyclic redundancy code (CRC), payload information (Payload), type/length, and MAC header.

In some embodiments, MAC header includes destination address (MAC DA), source address (MAC SA), and virtual local area network tag (VLAN Tag). The native frame 300 as illustrated in FIG. 3 is for illustrative purposes only, and the present disclosure is not limited thereto.

In some embodiments, the TRILL header and the Outer MAC Header may be added to the native frame 300 as illustrated in FIG. 3 in order to generate the packet with the TRILL header (not shown).

Figures 4, 5:
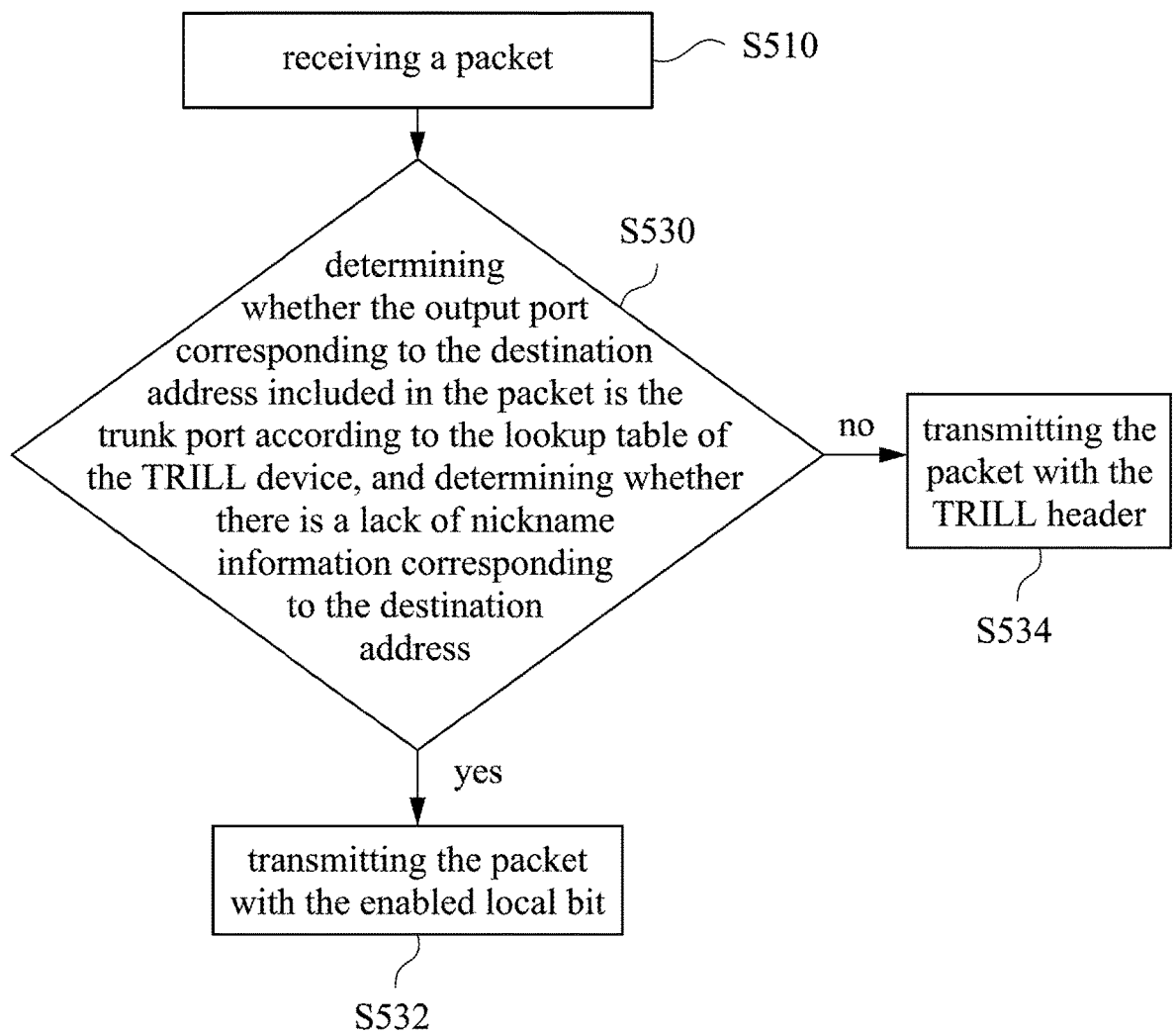
FIG. 4 is a structure diagram of the byte (first octet) of a MAC address according to some embodiments of the present disclosure.
FIG. 5 is a flow chart of a communication method according to some embodiments of the present disclosure.

FIG. 4 is a structure diagram of the byte (first octet) of a MAC address according to some embodiments of the present disclosure. In some embodiments, the format of the packet with the enabled local bit 400 is the same as the native frame 300 illustrated in FIG. 3. The feature presented herein is that a bit of the MAC address field of the packet includes a specific value, and the specific value is used as an identifier such that a packet may be identified as a packet with the enabled local bit according the specific value. In an embodiment, as illustrated in FIG. 4, the first byte of the MAC address includes bits b0 to b7. The specific value presented herein is that the value of b1 is 1; and therefore, if the value of b1 is indeed 1, it represents that the packet truly includes an enabled local bit. In the embodiment, the MAC address is a source address. In some other embodiments, the specific value may be a value of any byte and/or any bit in the MAC address. In some embodiments, the packet 400 with the enabled local bit as illustrated in FIG. 4 may be generated by setting the value of the first bit b1 of the source address (MAC SA) in the native frame 300, as shown in FIG. 3, to be 1.

Furthermore, when the TRILL devices 110A to 110D receive the packet with the enabled local bit, the processor 118 of each of the TRILL devices 110A to 110D drops the packet with the enabled local bit. In this way, it ensures that the packets not only can be received by the non-TRILL devices, but also won't be forwarded cyclically thereby affecting the performance of the network transmission.

Through the above-mentioned method, the embodiments of the present disclosure may effectively access and/or manage the non-TRILL devices when the non-TRILL devices and the TRILL devices are simultaneously existed in the communication system 100 as illustrated in FIG. 1. In addition, the packet with the enabled local bit is dropped after being received by the TRILL devices such that the probability of the packet with the enabled local bit being cyclically forwarded is reduced.

Reference is made to FIG. 5. FIG. 5 is a flow chart of a communication method 500 according to some embodiments of the present disclosure. In some embodiments, the communication method 500 is suitable for the TRILL devices 110A to 110D. As illustrated in FIG. 5, the communication method 500 includes several operations S510, S530, S532, and S534.

In operation S510, the operation of receiving a packet is performed. For example, reference is made to FIG. 1, FIG. 2 and FIG. 5. The TRILL device 110A may receive packets, native packets or native frames, from the server 150A through the communication interface 119 of the TRILL device 110A.

In operation S530, operations as follows are performed: determining whether the output port corresponding to the destination address included in the packet is a trunk port according to the lookup table of the TRILL device, and determining whether there is a lack of nickname information corresponding to the destination address. If it is determined that the output port corresponding to the destination address included in the packet is a trunk port, and there is a lack of nickname information corresponding to the destination address, operation S532 is performed. On the contrary, if it is determined that the output port corresponding to the destination address included in the packet is a trunk port and the nickname information corresponding to the destination address exists in the lookup table, operation S534 is performed.

For example, reference is made to FIG. 1, FIG. 2 and FIG. 5. If the TRILL device 110A receives the native frame transmitted from the server 150A through the access port 112A, the processor 118 of the TRILL device 110A looks up the lookup table of the TRILL device 110A in order to determine that the output port corresponding to the destination address of the native frame is the trunk port, and determine whether there is a lack of the nickname information corresponding to the destination address of the native frame.

In operation S532, the operation of transmitting the packet with the enabled local bit is performed. For example, reference is made to FIG. 1, FIG. 2 and FIG. 5. After the TRILL device 110A receives the packet transmitted from the server 150A through the access port 112A, the processor 118 of the TRILL device 110A determines that the output port corresponding to the destination address of the native packet is the trunk port 114A2, and determines that there is a lack of nickname information corresponding to the destination address of the native packet according to the lookup table of the TRILL device 110A. The processor 118 of the TRILL device 110A forwards the packet with the enabled local bit through the trunk port 114A2 of the communication interface 119. It should be noted that, operation S532 further includes the operations as follows: sending the packet with the TRILL header according to the TRILL protocol, and filling the field of the Egress Nickname of the TRILL header with a nick name corresponding to a nick name of the root router.

In operation S534, the operation of transmitting the packet with the TRILL header is performed. For example, reference is made to FIG. 1, FIG. 2 and FIG. 5. After the TRILL device 110A receives the packet transmitted by the server 150A through the access port 112A, the processor 118 of the TRILL device 110A determines that the output port corresponding to the destination address of the packet is not a trunk port and determines that the nickname information corresponding to the destination address exists in the lookup table. The TRILL device 110A forwards the packet with the TRILL header through the communication interface 119, in which the field of the Egress Nickname of the TRILL header is filled with the nickname information corresponding to the destination address.

It may be seen from the above-mentioned embodiments of the present disclosure, in the embodiments of the present disclosure, the non-TRILL devices may be efficiently accessed and/or managed when the non-TRILL devices and the TRILL devices are simultaneously existed in the communication system 100 as illustrated in FIG. 1. In addition, when the TRILL devices receive the packet with the enabled local bit, the packet with the enabled local bit may be dropped such that the probability of the packet with the enabled local bit being cyclically forwarded is thus reduced.

In some embodiments, the server 150A or 150B may be a circuit or other equivalent devices having functions such as storage, calculation, data reading, signal or information receiving, and signal or information transmitting. That is to say, through the above-mentioned operations, packets with the destination of non-TRILL devices 130F may be transmitted from the TRILL devices 110A to the non-TRILL devices 130F successfully.

In some embodiments, the processor 118 of the TRILL devices 110A to 110D may be circuits with functions such as storage, operation, data reading, signal or information receiving, signal or information transmitting, etc., or other components with equivalent functions, including a central processor (CPU), a processor chip, etc.

In some embodiments, the memory 117 of the TRILL devices 110A to 110D may be circuits with functions such as data storage, data reading, signal or information receiving, signal or information transmitting, etc., including dynamic random access memory, static random access memory, and flash memory, etc.

In some embodiments, each of the non-TRILL devices 130A to 130F further includes a processor (not shown), a memory (not shown) and a communication interface (not shown).

Although the present disclosure has been described in considerable detail with reference to certain embodiments thereof, other embodiments are possible. Therefore, the spirit and scope of the appended claims should not be limited to the description of the embodiments contained herein.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A network device supporting TRILL protocol, comprising:
   a memory comprising a lookup table stored therein;
   a processor coupled to the memory; and
   a communication interface, coupled to the processor, wherein the communication interface comprises a trunk port and an access port and is configured to receive a first packet;
   wherein when the processor determines that an output port corresponding to a destination address of the first packet is the trunk port, and there is a lack of nickname information corresponding to the destination address according to the lookup table, a second packet is transmitted through the trunk port of the communication interface;
   wherein the second packet comprises an enabled local bit, and the second packet and the first packet comprise the same payload information.

2. The network device supporting TRILL protocol of claim 1, wherein when the first packet does not comprise a TRILL header and is received from the access port of the communication interface, the processor is further configured to transmit a third packet through the trunk port of the communication interface, wherein the third packet is embedded with a TRLL header, and the third packet, the first packet and the second packet comprise the same payload information.

3. The network device supporting TRILL protocol of claim 1, wherein when the trunk port of the communication interface receives the second packet, the second packet is dropped.

4. The network device supporting TRILL protocol of claim 1, wherein the lookup table further comprises a forwarding table and a nickname table.

5. The network device supporting TRILL protocol of claim 1, wherein the lookup table further comprises destination address information, nickname information, trunk port information and access port information.

6. The network device supporting TRILL protocol of claim 1, wherein the enabled local bit is that a MAC address comprises a specific value.

7. The network device supporting TRILL protocol of claim 6, wherein the MAC address is a source address.

8. The network device supporting TRILL protocol of claim 6, wherein the specific value is included in a byte of MAC address.

9. The network device supporting TRILL protocol of claim 8, wherein the specific value is implemented by setting a second bit of the byte to be 1.

10. A communication method, suitable for a network device supporting TRILL protocol, comprising:
   receiving a first packet by a communication interface;
   transmitting a second packet through a trunk port of the communication interface after an enabled local bit included in a second packet when a processor determines that an output port corresponding to a destination address of the first packet is a trunk port and there is a lack of nickname information corresponding to the output port;
   wherein the second packet and the first packet comprise the same payload information.

11. The communication method of claim 10, wherein when the first packet does not comprise a TRILL header and the first packet is received by an access port of the communication interface, the processor further transmits a third packet with the TRILL header through the trunk port of the communication interface, wherein the third packet, the first packet and the second packet comprise the same payload information.

12. The communication method of claim 10, wherein setting the enable local bit in the second packet is setting a specific value in a MAC address of the second packet.

13. The communication method of claim 12, wherein the specific value included in a MAC address of the second packet is the specific value included in a byte of the MAC address.

14. The communication method of claim 13, wherein the specific value included in a byte of the MAC address is 1 set in a second bit of the byte.

* * * * *